United States Patent
Yoo et al.

(10) Patent No.: US 12,249,002 B2
(45) Date of Patent: Mar. 11, 2025

(54) WATERMARK-BASED IMAGE RECONSTRUCTION

(71) Applicant: Google LLC, Mountain View, CA (US)

(72) Inventors: Innfarn Yoo, Fremont, CA (US); Feng Yang, Sunnyvale, CA (US); Xiyang Luo, Pasadena, CA (US)

(73) Assignee: GOOGLE LLC, Mountain View, CA (US)

( * ) Notice: Subject to any disclaimer, the term of this patent is extended or adjusted under 35 U.S.C. 154(b) by 181 days.

(21) Appl. No.: 17/764,445

(22) PCT Filed: Dec. 5, 2019

(86) PCT No.: PCT/US2019/064661
§ 371 (c)(1),
(2) Date: Mar. 28, 2022

(87) PCT Pub. No.: WO2021/112852
PCT Pub. Date: Jun. 10, 2021

(65) Prior Publication Data
US 2022/0335560 A1    Oct. 20, 2022

(51) Int. Cl.
*G06T 1/00*    (2006.01)
*G06N 3/045*    (2023.01)
(Continued)

(52) U.S. Cl.
CPC ........... *G06T 1/0057* (2013.01); *G06N 3/045* (2023.01); *G06T 3/4046* (2013.01); *G06T 9/002* (2013.01); *G06T 2201/0083* (2013.01)

(58) Field of Classification Search
CPC ..... G06T 1/0057; G06T 3/4046; G06T 9/002; G06T 2201/0083; G06T 2201/0203; G06N 3/045; H04N 19/467
See application file for complete search history.

(56) References Cited

U.S. PATENT DOCUMENTS

| | | | |
|---|---|---|---|
| 6,584,210 B1 * | 6/2003 | Taguchi | H04N 1/32235 |
| | | | 713/176 |
| 11,968,344 B2 | 4/2024 | Gharaibeh et al. | |

(Continued)

FOREIGN PATENT DOCUMENTS

CN          108399593         8/2018

OTHER PUBLICATIONS

GIF2video, Wang et al, Apr. 2019 (Year: 2019).*
(Continued)

*Primary Examiner* — Jianxun Yang
(74) *Attorney, Agent, or Firm* — DORITY & MANNING P.A.

(57) ABSTRACT

A computer-implemented method that provides watermark-based image reconstruction to compensate for lossy encoding schemes. The method can generate a difference image describing the data loss associated with encoding an image using a lossy encoding scheme. The difference image can be encoded as a message and embedded in the encoded image using a watermark and later extracted from the encoded image. The difference image can be added to the encoded image to reconstruct the original image. As an example, an input image encoded using a lossy JPEG compression scheme can be embedded with the lost data and later reconstructed, using the embedded data, to a fidelity level that is identical or substantially similar to the original.

22 Claims, 6 Drawing Sheets

(51) Int. Cl.
    *G06T 3/4046*    (2024.01)
    *G06T 9/00*    (2006.01)

(56) References Cited

U.S. PATENT DOCUMENTS

| | | | |
|---|---|---|---|
| 2002/0013903 A1 | 1/2002 | Le Floch | |
| 2003/0095682 A1* | 5/2003 | Joo | G06T 1/0057 382/100 |
| 2008/0276089 A1 | 11/2008 | Tian | |
| 2009/0080688 A1* | 3/2009 | Au | G06T 1/0028 382/100 |
| 2017/0061562 A1 | 3/2017 | Kim et al. | |
| 2020/0126176 A1* | 4/2020 | Lees | G06T 1/0028 |

OTHER PUBLICATIONS

Eilertsen et al., TOG 2017, HDR Image Reconstruction from a Single Exposure Using Deep CNNs, arXiv:1710.07480v1, Oct. 20, 2017, 15 pages.

Google blogs, "Image Compression with Neural Networks", Sep. 29, 2016, htttps://www.googblogs.com/image-compression-with-neural-networks/, retrieved on Jun. 27, 2022, 4 pages.

International Preliminary Report of Patentability for PCT/US2019/064661, mailed on Jun. 16, 2022, 7 pages.

International Search Report and Written Opinion dated Aug. 7, 2020 in PCT/US2019/064661, 10 pages.

Qin et al., "Convolutional Recurrent Neural Networks for Dynamic MR Image Reconstruction", arXiv:1712.01751v3, Oct. 14, 2018, 11 pages.

Teodoro et al., Image Restoration and Reconstruction Using Variable Splitting and Class-Adapted Image Priors, arXiv:1602.04052v2, May 23, 2016, 5 pages.

Wang et al., "GIF2Video: Color Dequantization and Temporal Interpolation of GIF images", arXiv:1901.02840v2, Apr. 8, 2019, 10 pages.

Zhu et al., "HiDDeN: Hiding Data with Deep Networks", arXiv:1807.09937v1, Jul. 26, 2018, 22 pages.

Machine Translated Chinese Search Report Corresponding to Application No. 201980101255.8 on Jul. 30, 2024.

* cited by examiner

WATERMARK-BASED IMAGE RECONSTRUCTION

PRIORITY CLAIM

The present application is based on and claims priority to PCT Application Number PCT/US2019/064661 having a filing date of Dec. 5, 2019. Applicant claims priority to and the benefit of each of such application and incorporate all such application herein by reference in its entirety.

FIELD

The present disclosure relates generally to watermark-based image reconstruction techniques. More particularly, the present disclosure relates to systems and methods for watermarking an encoded image with data lost in the encoding step for later image reconstruction.

BACKGROUND

Image and video files are commonly encoded using a variety of encoding schemes for a number of different applications. Large data entities require significant resource investment and allocation of storage infrastructure to store these images and/or video files. As a result, these files often must be encoded using a lossy compression scheme to enable more efficient storage, retrieval and transmission.

However, encoding images and/or video files using a lossy compression scheme can cause a significant loss of image fidelity, and lossless compression alternatives rarely offer the space reduction necessary to enable efficient storage. As a result, when storing and transmitting image and/or video files, a choice must be made between loss of fidelity and significant resource investment for additional storage infrastructure.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to perform watermark-based image reconstruction to compensate for lossy encoding schemes. The method includes obtaining, by one or more computing devices, an input image. The method includes generating, by the one or more computing devices, a first output image by encoding and decoding the input image according to an encoding scheme. The method includes determining, by the one or more computing devices, a difference image that describes a difference between the input image and the first output image. The method includes generating, by the one or more computing devices and using a machine-learned message embedding model, a second output image that comprises an embedded message that is based at least in part on the difference image.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

DETAILED DESCRIPTION

Overview

Example embodiments of the present disclosure are directed to systems and methods for watermark-based image reconstruction using machine-learned models. In particular, systems and methods described herein are directed to using a machine-learned message embedding model to embed a message into an image, where the message represents data lost from the image due to an encoding (and decoding) process. The embedded message can later be extracted from the image by a machine-learned message extraction model and the extracted message can be used in reconstructing the original image. Thus, as one example, an image can be compressed using a lossy compression technique (e.g., JPEG compression) to generate a first output image. A message that represents the data lost from the image due to such compression can be embedded (e.g., watermarked as image noise) within the original image to generate a second output image. The embedded message can be extracted from the second output image and can be used to reconstruct the original image from the second output image, thereby at least partially reversing the loss of image fidelity caused by compression. The proposed techniques represent a significant advancement in reconstructing images that have suffered data loss from image encoding processes. In particular, by capturing and embedding the data lost from the image during compression as a message, the proposed systems provide a method for image reconstruction that can produce reconstructed images more accurately than conventional techniques.

As one example, computing devices (e.g., a distributed network of computing devices) can obtain an input image (e.g., a RAW image). The computing devices can generate a first output image by encoding and decoding the image according to an encoding scheme. As one example, the computing devices may encode and decode the input image using a lossy JPEG compression scheme, the first output image being a decoded JPEG representation of the input image. A difference image can be determined that describes a difference between the first image and the first output image. For example, the difference image can describe the data lost as a pixel-by-pixel difference between the input image and the first output image. A machine-learned message embedding model can embed a message based on the difference image into the first image (e.g., as an image noise watermark) to produce a second output image. As one example, the data lost from JPEG compression can be represented as a latent space message vector. A watermark can be generated based on the message vector. The message can be embedded into the JPEG (e.g., by applying the watermark as image noise) to produce a second output image. The second output image can be encoded and then stored or transmitted.

The encoded second output image can be decoded, and using a machine-learned message extraction model, the message vector can be extracted from the second output image and used in reconstructing the difference image. For example, a machine-learned watermark extraction model can extract the message vector and a machine-learned difference reconstruction model can use the extracted message vector to generate a reconstruction of the difference image, which in turn can be used to reconstruct the input image. As one example, the input image can be reconstructed by adding the reconstructed difference image to the second output image. Thus, although the input image of the above examples was degraded by a lossy compression scheme, an identical or near-identical version of the input image was able to be reconstructed using the embedded message watermarked in the image.

The present disclosure provides a number of technical effects and benefits. As one example technical effect and benefit, the systems and methods of the present disclosure enable a significant advancement in reconstructed image quality compared to other approaches. Most other methods known in the art attempt to directly recover an input image from an encoded image. As an example, methods such as GIF2Video remove GIF artifacts by combining neural networks and the Lucas-Kanade method (See Yang Wang, Haibin Huang, Chuan Wang, Tong He, Jue Wang, Minh Hoai, *GIF2Video: Color Dequantization and Temporal Interpolation of GIF Images*, The IEEE Conference on Computer Vision and Pattern Recognition (CVPR), pages 1419-1428 (2019)). However, under this approach, the reconstruction accuracy of a machine-learned model is necessarily limited because it cannot utilize the data that was initially lost in encoding. The present method differs from these previous approaches by embedding (e.g., watermarking) a message describing data lost during the encoding step into the image. Later, the message can be extracted and used to reconstruct the input image. In this fashion, a machine-learned model(s) can utilize the initial data lost during encoding and therefore produce a more accurate reconstructed image.

As another example technical effect and benefit, the systems and methods of the present disclosure enable a number of image encoding schemes (e.g., graphics interchange format (GIF) encoding) to be used in situations where they previously would not be chosen. As one example, a lossy GIF encoding scheme may not have previously been chosen in certain situations due to the data loss inherent to some lossy GIF encoding schemes. Using the method of the present disclosure, GIF encoded images may be reconstructed to a degree of accuracy sufficient to enable GIF encoding in situations requiring minimal image data loss. By enabling these additional encoding schemes, the present disclosure allows for more compression of images, necessarily saving storage space used to store images. Stated differently, aspects of the present disclosure represent an improvement in the curve of compression gains versus quality reduction. Thus, versus past compression techniques, additional compression gains can be achieved by the present disclosure while still retaining the same ultimate quality. These compression gains result in savings of resources such as memory usage, network bandwidth usage, etc.

With reference now to the Figures, example embodiments of the present disclosure will be discussed in further detail. Throughout the present disclosure, embodiments will be described with reference to JPEG and GIF compression, though it will be appreciated that systems and methods disclosed herein may additionally utilize other image compression techniques.

Example Devices and Systems

Figure 1:
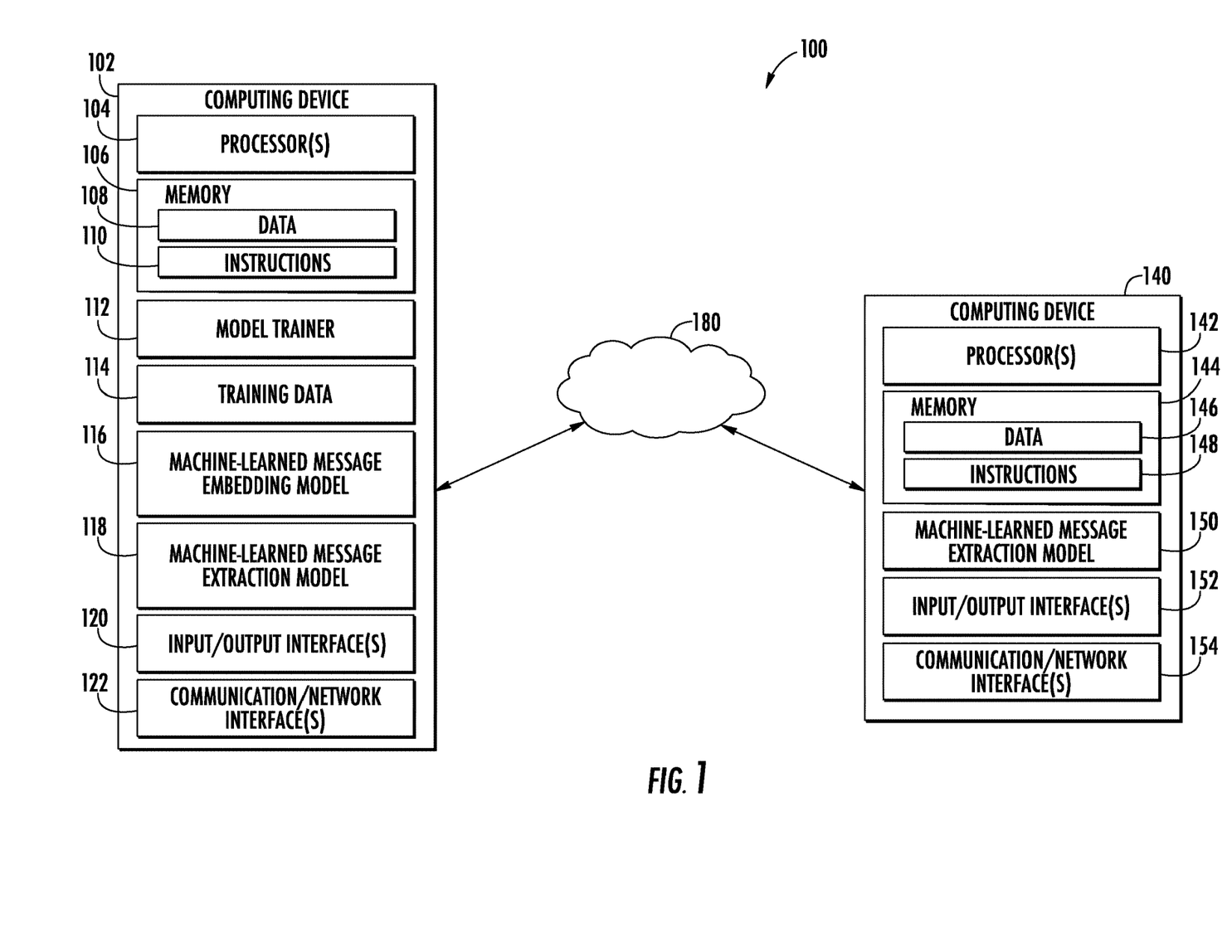
FIG. 1 depicts a block diagram of an example computing system according to example embodiments of the present disclosure.

FIG. 1 depicts a block diagram of an example computing system 100 that performs embedding and extraction of messages using machine-learned models that are trained according to example embodiments of the present disclosure. The system 100 includes a first computing device 102 and a second computing device 140 that are communicatively coupled over a network 180.

The first computing device 102 can be any type of computing device, such as, for example, a personal computing device (e.g., laptop or desktop), a mobile computing device (e.g., smartphone or tablet), a gaming console or controller, a wearable computing device, an embedded computing device, a personal assistant computing device, or any other type of computing device.

The first computing device 102 includes one or more processors 104 and a memory 106. The one or more processors 104 can be any suitable processing device (e.g., a processor core, a microprocessor, an ASIC, a FPGA, a controller, a microcontroller, etc.) and can be one processor or a plurality of processors that are operatively connected. The memory 106 can include one or more non-transitory computer-readable storage mediums, such as RAM, ROM, EEPROM, EPROM, flash memory devices, magnetic disks, etc., and combinations thereof. The memory 106 can store data 108 and instructions 110 which are executed by the processor 104 to cause the first computing device 102 to perform operations.

According to an aspect of the present disclosure, the first computing device 102 can store or include one or more machine-learned models. The machine-learned models can be or can otherwise include one or more neural networks (e.g., deep neural networks) or the like. Neural networks (e.g., deep neural networks) can be feed-forward neural networks, convolutional neural networks, and/or various other types of neural networks.

More particularly, machine-learned models can be implemented to provide embedding and extraction of messages within an input image. As one example, the machine-learned models can include a machine-learned message embedding model 116 and a machine-learned message extraction model 118. In particular, the machine-learned message embedding model 116 can receive a difference image describing a difference between an input image and an encoded first output image and generate a message vector (e.g., a latent space vector) representing the difference image. The machine-learned message embedding model 116 can receive the message and generate a watermark representing the message vector. The watermark can be applied to the input image or the first output image to generate a second output image. The machine-learned message extraction model 118 can obtain the second output image as an input and extract the message vector from the second output image to obtain an extracted message vector. The machine-learned message extraction model 118 can receive the extracted message as an input and provide as output a reconstruction of the difference image. The reconstructed difference image can be added to the input image to generate a reconstructed input image.

The first computing device 102 can also include model trainer(s) 112. The model trainer 112 can use training data 114 to simultaneously train or re-train machine-learned models, such as the machine-learned message embedding model 116 and the machine-learned message extraction model 118, stored at the first computing device 102 using various training or learning techniques, such as, for example, backwards propagation of errors (e.g., truncated backpropagation through time). In particular, the model trainer 112 can use training data 114 to simultaneously train or re-train the machine-learned message embedding model 116 and machine-learned message extraction model 118. The specific training signal(s) used to train or retrain the machine-learned models will be discussed in-depth in the following figures.

The model trainer 112 can perform a number of generalization techniques (e.g., weight decays, dropouts, etc.) to improve the generalization capability of the models being trained. Thereafter, the machine-learned message embedding model 116 and machine-learned message extraction model 118 can be used immediately to embed and extract messages in images.

Additionally, in some implementations, the machine-learned message embedding model 116 can include a machine-learned watermark generation model and machine-learned message generation model. Similarly, in some implementations, the machine-learned message extraction model 118 can include a machine-learned watermark extraction model and a machine-learned difference reconstruction model.

The first computing device 102 can also include one or more input/output interface(s) 122. One or more input/output interface(s) 122 can include, for example, devices for receiving information from or providing information to a user, such as a display device, touch screen, touch pad, mouse, data entry keys, an audio output device such as one or more speakers, a microphone, haptic feedback device, etc. An input/output interface(s) 122 can be used, for example, by a user to control operation of the first computing device 102.

The first computing device 102 can also include one or more communication/network interface(s) 124 used to communicate with one or more systems or devices, including systems or devices that are remotely located from the first computing device 102. The communication/network interface(s) 124 can include any circuits, components, software, etc. for communicating with one or more networks (e.g., network 180). In some implementations, the communication/network interface(s) 124 can include, for example, one or more of a communications controller, receiver, transceiver, transmitter, port, conductors, software, and/or hardware for communicating data.

The second computing device 140 includes one or more processors 142 and a memory 144. The one or more processors 142 can be any suitable processing device (e.g., a processor core, a microprocessor, an ASIC, a FPGA, a controller, a microcontroller, etc.) and can be one processor or a plurality of processors that are operatively connected. The memory 144 can include one or more non-transitory computer-readable storage mediums, such as RAM, ROM, EEPROM, EPROM, flash memory devices, magnetic disks, etc., and combinations thereof. The memory 144 can store data 146 and instructions 148 which are executed by the processor 142 to cause the second computing device 140 to perform operations.

As described above, the second computing device 140 can store or otherwise include one or more machine-learned models. The machine-learned models can be or can otherwise include one or more neural networks (e.g., deep neural networks) and the neural networks (e.g., deep neural networks) can be feed-forward neural networks, convolutional neural networks, and/or various other types of neural networks.

More particularly, the second computing device 140 can receive and store a trained machine-learned model, for example, from the first computing device 102 via the network 180. For example, the computing device 140 can receive the machine learned message extraction model 150 (e.g., the machine-learned watermark extraction model and the machine-learned difference reconstruction model) to provide reconstruction of input images from images with embedded messages that are transmitted to computing device 140. The second computing device 140 can use the machine-learned model(s) for the same or similar purposes as described above.

As an example, a second output image can be generated by the machine-learned message embedding model 116 and transmitted to the computing device 140 alongside and the machine-learned message extraction model 118 via network 180. The computing device 140 can use the transmitted machine-learned message extraction model 150 to extract a message from the transmitted second output image and generate a reconstructed input image corresponding to the second output image.

The second computing device 140 can also include one or more input/output interface(s) 152. The one or more input/output interface(s) 152 can include, for example, devices for receiving information from or providing information to a user, such as a display device, touch screen, touch pad, mouse, data entry keys, an audio output device such as one or more speakers, a microphone, haptic feedback device, etc. An input/output interface(s) 152 can be used, for example, by a user to control operation of the second computing device 140.

The second computing device 140 can also include one or more communication/network interface(s) 154 used to communicate with one or more systems or devices, including systems or devices that are remotely located from the second computing device 140. The communication/network interface(s) 154 can include any circuits, components, software, etc. for communicating with one or more networks (e.g., network 180). In some implementations, the communication/network interface(s) 154 can include, for example, one or more of a communications controller, receiver, transceiver, transmitter, port, conductors, software, and/or hardware for communicating data.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1 illustrates one example computing system that can be used to implement the present disclosure. Other computing systems can be used as well.

Example Model Arrangements

Figure 2:
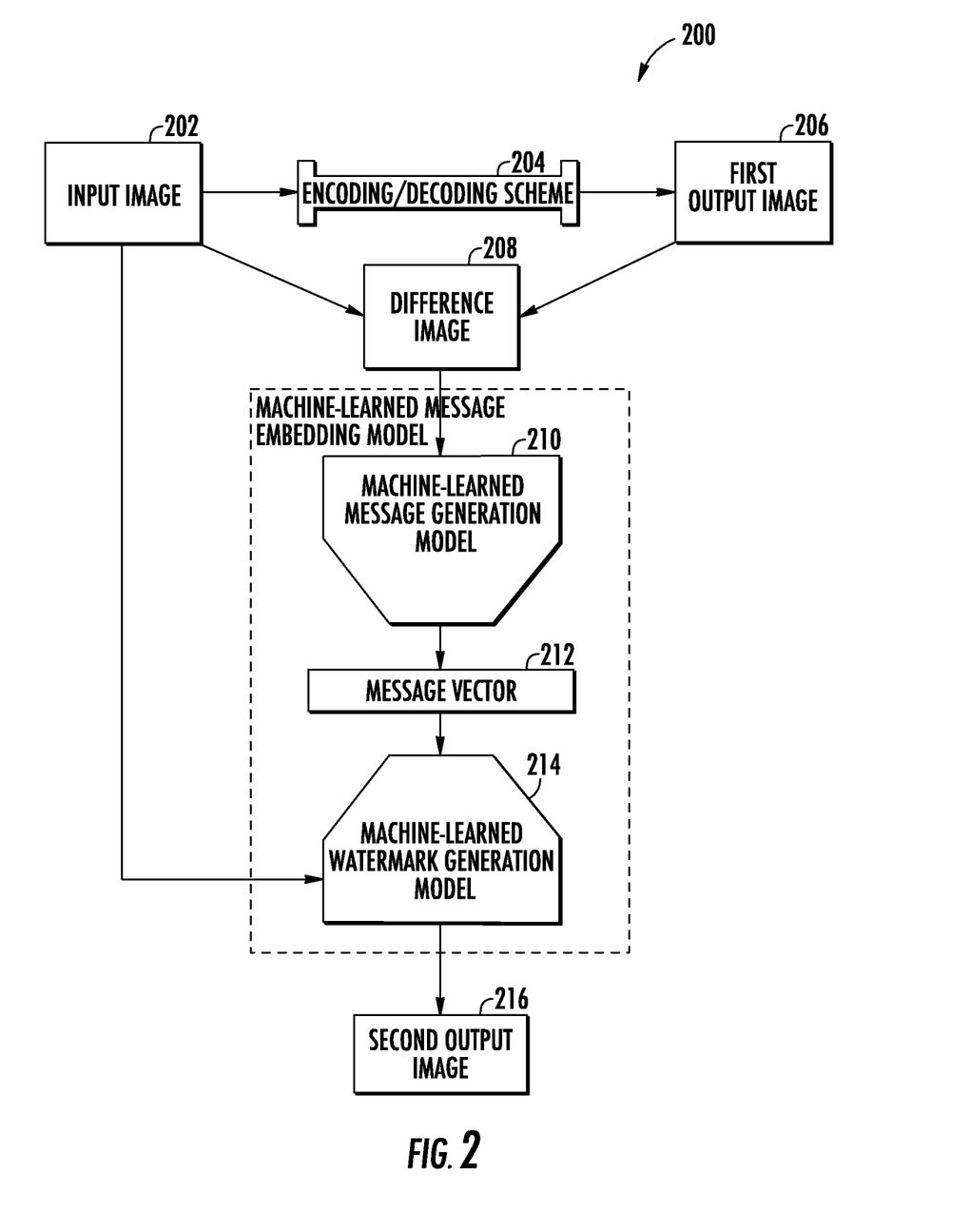
FIG. 2 depicts a flow diagram of an example method for generating a second output image according to example embodiments of the present disclosure.

FIG. 2 depicts a flow diagram of an example method for generating a second output image according to example embodiments of the present disclosure. The method can be performed by one or more computing devices (e.g., computing device 102, computing device 140, etc.), and includes, for example, obtaining an input image 202. The input image 202 can be a digital image file formatted in a RAW format, a raster format (e.g., bitmap image file (BMP), tagged image file format (TIFF), etc.), a vector format (e.g., computer graphics metafile (CGM), scalable vector graphics (SVG), etc.), or any other known image file format. The input image 202 can be obtained by one or more computing devices. In some implementations, the one or more computing devices can include one or more sensors (e.g., a digital camera) configured to capture an input image. In other implementations, the one or more computing devices can obtain the input image from another computing device.

In some implementations, the input image 202 that is obtained may include a plurality of frames. As one example, the input image 202 can be formatted in a format that allows for a plurality of image frames to be included in the image (e.g., graphics interchange format (GIF), WEBM, WEBP, etc.). As another example, the input image 202 can be formatted as a video format that allows for a plurality of image frames to be included in the image (e.g., MP4, VID, MPEG, AVI, etc.). It will be apparent to those skilled in the art that the following methods and processes can be applied, sequentially or non-sequentially, to each frame of a plurality of frames included in the input image 202.

The input image can go through encoding/decoding scheme 204 to produce a first output image 206. In some implementations, the encoding scheme applied to the input image 202 can be a differentiable lossy compression scheme. As one example, an input image 202 may be encoded and decoded using a differentiable JPEG compression scheme 204 to produce a first output image 206, the first output image 206 being formatted as a JPEG. The resulting first output image 206, encoded as a JPEG, may have lost data due to the lossy nature of the compression scheme used. As another example, the input image 202 including a plurality of frames may be encoded and decoded using a differentiable GIF compression scheme 204. Each frame of the resulting first output image 206, formatted as a GIF, can lose data due to the lossy nature of the compression scheme used.

A difference image 208 can be determined that describes a difference between the input image 202 and the first output image 206. More particularly, the difference image 208 can describe the data lost from encoding/decoding the input image 202 to the first output image 206 in the encoding/decoding scheme 204. In some implementations, the difference image 208 can represent the change in pixel values from encoding the first image 202.

A message vector 212 (e.g., a latent space vector) can be generated by a machine-learned message embedding model based at least in part on the difference image 208. In some implementations, the message vector 212 representation of the difference image 208 can be generated using a machine-learned message generation model 210 of the machine-learned message embedding model. In some implementations, the message vector 212 can be generated using an autoencoder (e.g., the machine-learned message generation model 210). However, it should be noted that the message vector 212 can be represented in a format other than a latent space vector. The format of the message, depending on the machine-learned model that is used, can be any type of encoded representation of the difference image 208. By representing the difference image 208 as a message vector that is reduced to its latent space vector representation, the difference image 208 can generally be reduced in size. In this fashion, the message can be more easily embedded in an encoded image without substantially increasing the space required to store the encoded image.

A second output image 216 can be generated by the machine-learned embedding model that includes the message vector 212. More particularly, a watermark (e.g., image noise) representing the message vector 212 can be generated and added to the input image 202 to obtain the second output image 216. Alternatively, in some implementations, the watermark can be added to the first output image 206 to obtain the second output image 216. In some implementations, the watermark can be generated by a machine-learned watermark generation model 214 of the message embedding model. In some implementations, the watermark can be generated by an autoencoder (e.g., the machine-learned watermark generation model 210).

In some implementations, the watermark can be applied to the image (e.g., input image 202 or first output image 206) by modifying pixel values associated with the image (e.g., RGB channel values, intensity values, etc.). As one example, the message can be watermarked in the image as image noise (e.g., random variations of brightness and/or color information). As another example, the message can be watermarked as image blur (e.g., blurring of one or more portions of pixels of the image). Although image noise and image blurring are given as examples, any other form of pixel value modification can be used to watermark the message in the second output image 216. Further, it should be noted that the second output image 216 can, before or after being embedded with the message, be encoded in the same manner as the first output image 206.

In some implementations, the machine-learned message embedding model (e.g., the machine-learned watermark generation model 214) can take both the message vector 212 and the input image 202 as inputs to generate the second output image 216 embedded with the message. The inclusion of the input image 202 before it is encoded and decoded using encoding/decoding scheme 204 can, in some instances, improve the performance of the machine-learned message embedding model by applying the encoding scheme to the input image 202 and adding the message vector 212 (e.g., adding a watermark representing the message vector 212) to the input image 202 simultaneously. As one example, the input image 202 can be encoded as a first output image 206 using an encoding scheme, and a message can be generated based at least in part on the difference (e.g., difference image 208) between the input image 202 and the encoded first output image 206. The machine-learned message embedding model can embed this message in the input image 202 while also applying the encoding scheme to the input image to produce an encoded second output image 206. Including the input image 202 in such a fashion can, in some instances, result in a higher quality second output image 206 (e.g., less visual distortion from watermarking, higher message fidelity, etc.).

In some implementations, the encoded second output image 216 can be stored and/or transmitted to another computing device. As one example, the one or more computing devices may store the encoded second output image 216 for long term storage. In this fashion, the encoded second output image 216 requires much less storage space than the input image 202 while still capable of being reconstructed to a level of quality identical or substantially similar to the input image 202. As another example, the one or more computing devices may transmit the encoded second output image 216 to another computing device. In this fashion, transmission of the encoded second output image requires less bandwidth than transmission of the input image while enabling image reconstruction to a level of quality identical or substantially similar to the input image 202.

Figure 3:
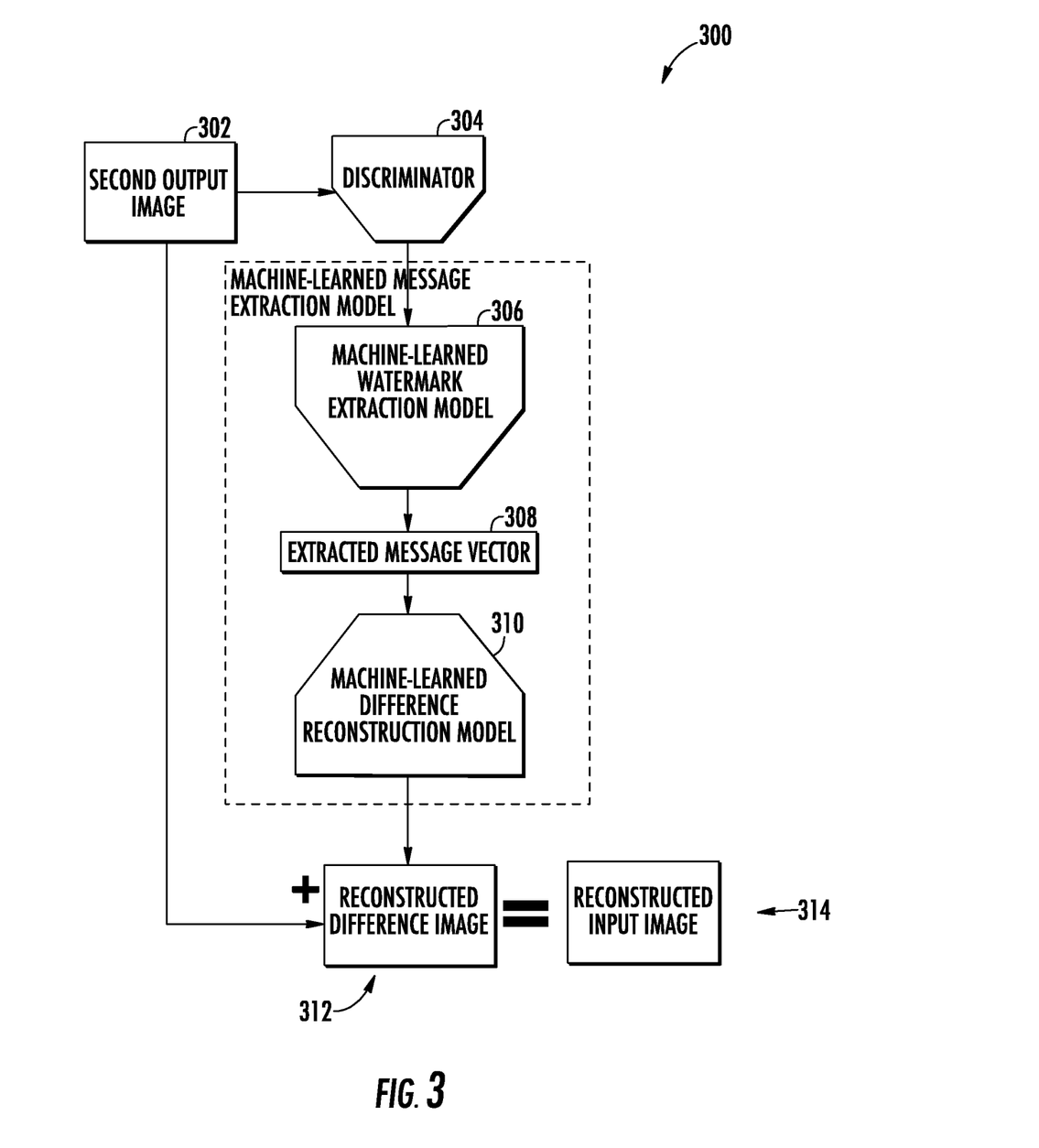
FIG. 3 depicts a flow diagram of an example method for reconstructing an input image from the second output image according to example embodiments of the present disclosure.

FIG. 3 depicts a flow diagram of an example method for reconstructing an input image from the second output image according to example embodiments of the present disclosure. The method can be performed by the one or more computing devices, and includes, for example, obtaining the second output image 302. If the second output image 302 is encoded, the encoded second output image can be decoded to produce a decoded second output image. A machine-learned message extraction model can extract the embedded message from the second output image 302 to reproduce an extracted message vector 308. In some implementations, the message can be extracted by a machine-learned watermark extraction model 306 of the machine-learned message extraction model. The machine-learned watermark extraction model 306 can be or can otherwise include one or more neural networks (e.g., deep neural networks) or the like. Neural networks (e.g., deep neural networks) can be feed-forward neural networks, convolutional neural networks, and/or various other types of neural networks. In some circumstances, the extracted message vector 308 reproduced by the machine-learned watermark extraction model 306 can lose at least some data throughout the embedding and extracting processes (e.g., encoding/decoding scheme 204, embedding message vector 212, etc.). However, such data loss does not necessarily render the extracted message vector 308 inoperable. In the case that the extracted message 308 is rendered inoperable, the usage of repetitive watermarking techniques can provide redundant messages that may survive to be extracted.

In some implementations, the second output image 302 can be evaluated by a discriminator 304 to determine if the second output image contains an embedded message vector 308. The discriminator 304 can be a machine-learned discriminative model (e.g., general adversarial network, linear classifier, support vector machine (SVM), etc.). The discriminator 304 can be trained to determine if the second output image 302 contains an embedded message vector 308. As one example, the discriminator 304 can be trained in a supervised fashion using training data including images known to contain embedded message vectors 308. If the discriminator 304 determines that the second output image 302 contains an embedded message, the machine-learned message extraction model (e.g., the machine-learned message extraction model 306) can take the second output image 302 as an input.

In some implementations, a reconstructed difference image 312 can be generated based at least in part on the embedded message vector 308 extracted by the machine-learned message extraction model. More particularly, a machine-learned difference reconstruction model 310 of the machine-learned message extraction model 306 can reconstruct the difference image based on the extracted message vector 308 to generate a reconstructed difference image 312. As one example, an extracted message vector 308 representing a difference image 208 as a latent space vector can serve as an input to an autoencoder (e.g., the machine-learned difference reconstruction model 310) to generate the reconstructed difference image 312. As another example, an extracted embedded message vector 308 representing a difference image 208 as a latent space vector can serve as an input some other type of neural network architecture (e.g., feed-forward neural network, convolutional neural network, etc.) to generate the reconstructed difference image 312.

A reconstructed input image 314 can be generated based at least in part on the decoded second output image 302 and the reconstructed difference image 312. More particularly, the reconstructed difference image 312 can be added to the decoded second output image 302 to generate a reconstructed input image 314. As one example, each pixel of the decoded second output image 302 can possess a difference in pixel value from the pixels of the input image 202. The reconstructed difference image 312, including difference values for each pixel of the decoded output image 302, can be added pixel-by-pixel to the decoded output image 302 to reconstruct the input image (e.g., generate the reconstructed input image 314).

The aforementioned machine-learned models (e.g., machine-learned message embedding and extraction models, machine-learned watermark generation and extraction models, machine-learned message generation and difference reconstruction models, discriminators, etc.) can be trained either together or simultaneously (e.g., in a joint fashion in which one or more gradients are passed from one network to another). The specifics of training the aforementioned machine-learned models with be discussed in greater detail in the subsequent figures.

Example Methods

Figure 4:
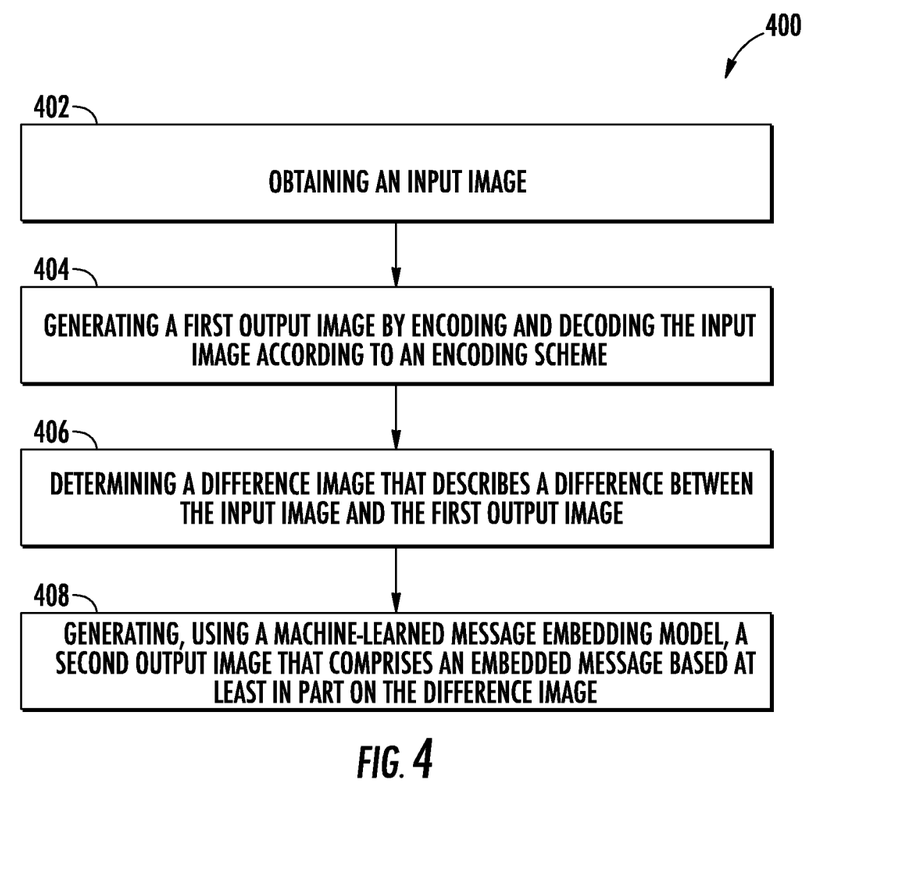
FIG. 4 is a flowchart depicting an example method of generating a second output image in accordance with example embodiments.

FIG. 4 is a flowchart depicting an example method of generating a second output image in accordance with example embodiments. The method 400 can be implemented, for instance, using computing device(s) of FIG. 1. FIG. 4 depicts steps performed in a particular order for purposes of illustration and discussion. Those of ordinary skill in the art, using the disclosures provided herein, will understand that various steps of any of the methods described herein can be omitted, rearranged, performed simultaneously, expanded, and/or modified in various ways without deviating from the scope of the present disclosure.

At 402, the method can include obtaining an input image. The input image can be a digital image file formatted in a RAW format, a raster format (e.g., bitmap image file (BMP), tagged image file format (TIFF), etc.), a vector format (e.g., computer graphics metafile (CGM), scalable vector graphics (SVG), etc.), or any other known image file format.

In some implementations, the input image may include a plurality of frames. As one example, the input image can be formatted in a format that allows for a plurality of image frames to be included in the image (e.g., graphics interchange format (GIF), WEBM, WEBP, etc.). As another example, the input image can be formatted as a video format that allows for a plurality of image frames to be included in the image (e.g., MP4, VID, MPEG, AVI, etc.).

In some implementations, obtaining the input image can include receiving the input image from a computing device. The input image can be transmitted from one computing device to another through a network or through storage medium (e.g., flash storage media, a portable hard drive, etc.) In some implementations, the input image can be captured by a computing device configured to capture image data using one or more sensors (e.g., digital camera, webcam, etc.).

At 404, the method can include generating a first output image by encoding and decoding the input image according to an encoding scheme. The encoding scheme can be any differentiable or approximately-differentiable encoding scheme. Although image compression schemes are primarily referenced, the encoding scheme can also be a non-compressing image and/or video encoding scheme. As one example, an input image may be encoded and decoded using a differentiable JPEG compression scheme to produce a first output image, the first output image being formatted as a JPEG. As another example, an input image including a plurality of frames may be encoded and decoded using a differentiable GIF compression scheme.

Differentiable JPEG encoding schemes have been previously explored in the art. As an example, a differentiable approximation of JPEG encoding has been described in "JPEG-resistant adversarial images" (See Richard Shin, Dawn Song, *JPEG-Resistant Adversarial Images*, NIPS 2017 Workshop on Machine Learning and Computer Security, pages 1-3 (2017)). Similarly, differentiable approximation of other non-differentiable compression schemes (e.g., GIF and other image compression schemes) has been described in "Soft-to-Hard Vector Quantization for End-to-End Learning Compressible Representations" (See Eirikur Agustsson et al., *Soft-to-Hard Vector Quantization for End-to-End Learning Compressible Representations*, Advances in Neural Information Processing Systems, pages 1-9 (2017)). Accordingly, although differentiable JPEG encoding is used in some examples to illustrate the function of current embodiments, any differentiable or approximately differentiable image encoding scheme may be used. Further, any encoding scheme that is not currently differentiable can be used if a differentiable or approximately differentiable version or method of the encoding scheme is later developed.

At 406, the method can include determining a difference image that describes a difference between the input image and the first output image. The difference image can describe the data lost from encoding/decoding the input image to the first output image in the encoding/decoding scheme. For instance, applying a differentiable lossy JPEG encoding scheme to an input image will necessarily cause the loss of at least some data on a pixel-by-pixel basis. The difference image can describe the pixel-by-pixel loss of data so that the input image can later be reconstructed. As one example, if a first pixel of the input image had a value of 15 before encoding and a value of 25 after encoding, the difference image can represent the difference between pixel values as 10. This change in pixel values can be represented similarly for each pixel of the input image. Although the above example can be used to represent the difference image, it should be understood by those skilled in the art that any representation (e.g., integer, etc.) calculated in any manner (e.g., added, subtracted, etc.) can be used to represent the pixel-by-pixel difference in pixel values between the input image and the first output image.

At 408, the method can include generating, using a machine-learned message embedding model, a second output image that comprises an embedded message based at least in part on the difference image. The second output image can, in some implementations, comprise the first output image with an embedded message representing the difference image. The embedded message representing the difference image can be a latent space vector representation of the difference image. This message vector (e.g., the latent space vector representation) can be generated by a machine-learned message embedding model. More specifically, a machine-learned message generation model of the machine-learned message embedding model can generate the message vector. As one example, the message vector representing the difference image can be generated using an autoencoder (e.g., the machine-learned message generation model). As another example, the message vector representing the difference image can be generated using some other type of neural network architecture (e.g., feed-forward neural network, convolutional neural network, etc.).

The machine-learned message embedding model can generate a watermark based on the message vector. More particularly, a machine-learned watermark generation model of the machine-learned message embedding model can take the message vector as an input to generate a watermark representing the message vector. In some implementations, the machine-learned watermark generation model can additionally take the input image as an input. In such fashion, the machine-learned watermark generation model can generate the watermark and apply the watermark to the input image. The machine-learned watermark generation model can be or can otherwise include one or more neural networks (e.g., deep neural networks) or the like. Neural networks (e.g., deep neural networks) can be feed-forward neural networks, convolutional neural networks, and/or various other types of neural networks. As an example, the machine-learned watermark generation model can be an autoencoder. As another example, the machine learned watermark generation model can be a convolutional neural network.

The watermark can be added to the input image and then encoded using the encoding scheme to generate the second output image. Alternatively, in some embodiments, the watermark can be added to the first output image to generate the second output image. In some implementations, the watermark can be added to the image at multiple locations in the image. More particularly, the same watermark representing the message can be repetitively applied to different locations in the image. As one example, four corners of an image can be watermarked with the same watermark. As another example, the watermark can be applied to three randomized locations in the image. Thus, in such a fashion, repetitive watermarking can provide redundancies to ensure that the message is delivered in the case that one (or more) of the watermarks is rendered inoperable.

Although the machine-learned message generation model and machine-learned watermark generation model are discussed as being of the machine-learned message embedding model, in some implementations the machine-learned embedding model can perform both functions of the aforementioned models. As an example, the machine-learned message embedding model can be trained to perform the functions of both the machine-learned message generation model and the machine-learned watermark generation model, allowing the machine-learned message embedding model to generate both a message vector and a watermark representing the message vector.

Figure 5:
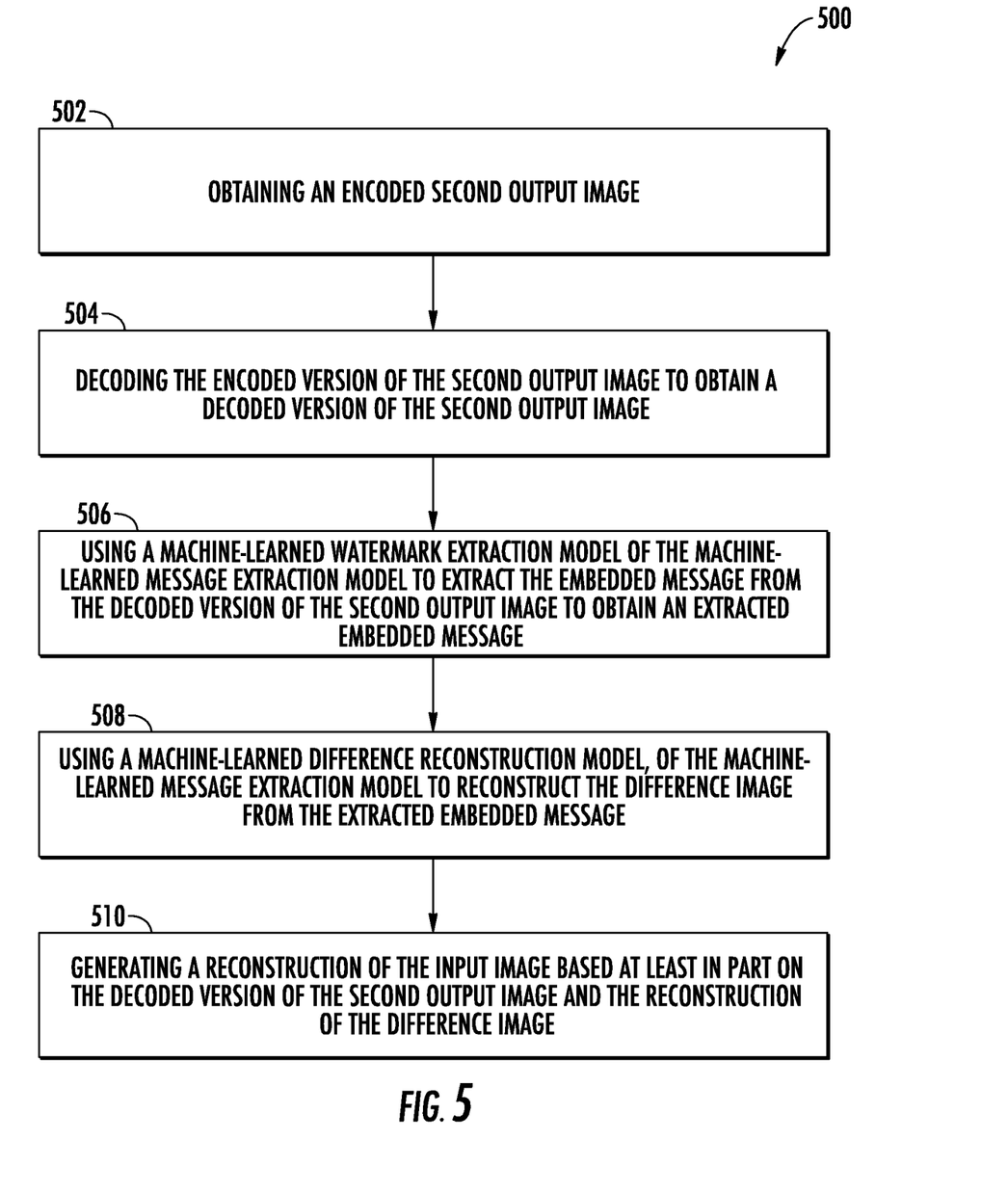
FIG. 5 is a flowchart depicting an example method of reconstructing an input image from the second output image in accordance with example embodiments.

FIG. 5 is a flowchart depicting an example method of reconstructing an input image from the second output image in accordance with example embodiments. The method 500 can be implemented, for instance, using computing device(s) of FIG. 1. FIG. 5 depicts steps performed in a particular order for purposes of illustration and discussion. Those of ordinary skill in the art, using the disclosures provided herein, will understand that various steps of any of the methods described herein can be omitted, rearranged, performed simultaneously, expanded, and/or modified in various ways without deviating from the scope of the present disclosure.

At 502, the method includes obtaining an encoded second output image. The encoded second output image can be an encoded (e.g., compressed) representation of the input image containing (e.g., watermarked with) an embedded message representing data lost from the input image due to encoding. The encoded second output image can be encoded using any differentiable encoding scheme (e.g., differentiable JPEG compression, differentiable GIF compression, etc.). The encoded second output image can be obtained in the same or similar fashion as the input image, as discussed in FIG. 4. In some implementations, the encoded second output image can be transmitted to a computing device alongside trained machine-learned extraction model. In such fashion, the embedded message can be extracted from the second output image by the receiving computing device using the trained machine-learned extraction model.

At 504, the method includes decoding the encoded version of the second output image to obtain a decoded version of the second output image. The second output image can be decoded as specified by the encoding scheme used to encode the first output image. In implementations where the encoding scheme used was a compression scheme, the decoded second output image will generally utilize less memory than the input image even with inclusion of the embedded message. However, in some implementations, the encoding scheme used is non-compressing.

At 506, the method can include using a machine-learned watermark extraction model of the machine-learned message embedding model to extract the embedded message from the decoded version of the second output image to obtain an extracted embedded message. More particularly, the machine-learned watermark extraction model can take the decoded second output image as an input and, by extracting the watermark from the second output image, obtain an extracted embedded message. The machine-learned watermark extraction model can be or can otherwise include one or more neural networks (e.g., deep neural networks) or the like. Neural networks (e.g., deep neural networks) can be feed-forward neural networks, convolutional neural networks, and/or various other types of neural networks. In some implementations, the embedded message can be extracted by an autoencoder (e.g., the machine-learned watermark extraction model). The extracted embedded message (e.g., the extracted message vector) can be the latent space vector representation of the difference image.

At 508, the method can include using a machine-learned difference reconstruction model of the machine-learned message embedding model to reconstruct the difference image from the embedded message. More particularly, the machine-learned difference reconstruction model can take the extracted embedded message (e.g., the extracted message vector) as an input and then output the reconstructed difference image. The machine-learned difference reconstruction model can be or can otherwise include one or more neural networks (e.g., deep neural networks) or the like. Neural networks (e.g., deep neural networks) can be feed-forward neural networks, convolutional neural networks, and/or various other types of neural networks. In some implementations, the difference image can be reconstructed by an autoencoder (e.g., the machine-learned difference reconstruction model). The reconstructed difference image, in some circumstances, may have suffered data loss from the encoding and decoding processes. Further, the initial difference image's representation as a latent space vector (e.g., a message vector) can additionally lead to a loss of data. However, such data loss does not necessarily render the reconstructed difference image inoperable.

Although the machine-learned watermark extraction model and machine-learned difference reconstruction model are discussed as being of the machine-learned message extraction model, in some implementations the machine-learned extraction model can perform both functions of the aforementioned models. As an example, the machine-learned message extraction model can be trained to perform the functions of both the machine-learned watermark extraction model and the machine-learned difference reconstruction model, allowing the machine-learned message extraction model to both extract a message vector and reconstruct the difference image from the message vector.

At 510, the method can include generating a reconstruction of the input image based at least in part on the decoded version of the second output image and the reconstruction of the difference image. More particularly, the reconstructed difference image can be added to the decoded second output image in a pixel-by-pixel fashion to reconstruct the input image. For example, the input image can have a first pixel value of 5 and the second output image can have a corresponding pixel value of 15. The reconstructed difference image can have a respective pixel value of 10, and adding the reconstructed difference image to the second output image can produce a respective pixel value of 15 for a reconstructed input image. In such fashion, the input image can be reconstructed pixel-by-pixel. Although the above example can be used to reconstruct the input image, it should be understood by those skilled in the art that that the reconstructed difference image can be utilized in any manner (e.g., added, subtracted, etc.) with the second output image to reconstruct the input image. It should be noted that in some circumstances, the corresponding pixel value of the reconstructed difference image may not identically match the difference from the initial difference image. As such, the reconstructed difference image can be identical or substantially similar to the initial difference image.

Figure 6:
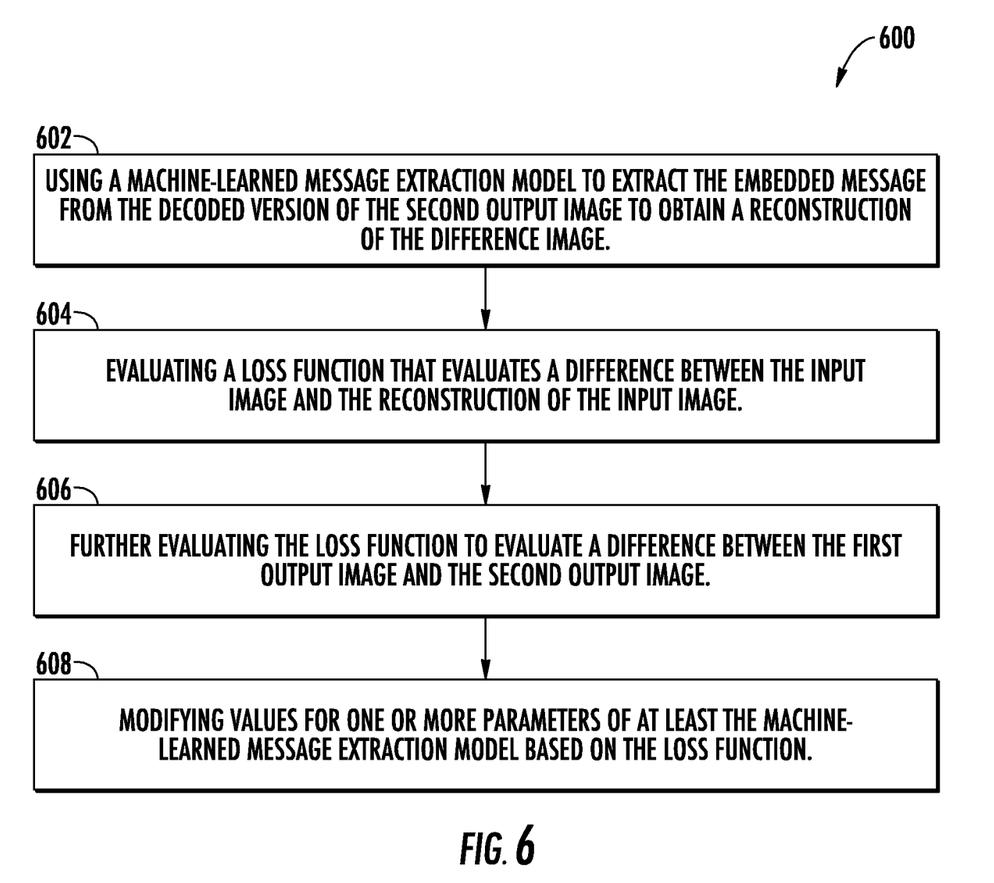
FIG. 6 is a flowchart depicting an example method for training one or more machine-learned models in accordance with example embodiments.

FIG. 6 is a flowchart depicting an example method for training one or more machine-learned models in accordance with example embodiments. The method 600 can be implemented, for instance, using computing device(s) of FIG. 1. FIG. 6 depicts steps performed in a particular order for purposes of illustration and discussion. Those of ordinary skill in the art, using the disclosures provided herein, will understand that various steps of any of the methods described herein can be omitted, rearranged, performed simultaneously, expanded, and/or modified in various ways without deviating from the scope of the present disclosure.

At 602, the method can include using a machine-learned message extraction model to extract the embedded message from the decoded version of the second output image to obtain a reconstruction of the difference image. In some implementations, a machine-learned watermark extraction model of the machine-learned message extraction model can extract the embedded message and a machine-learned difference reconstruction model of the machine-learned message extraction model can reconstruct the difference image. In some alternative implementations, the machine-learned message extraction model can perform both of the aforementioned functions. The aforementioned machine-learned models (e.g., machine-learned message extraction model, machine-learned extraction model, machine-learned difference reconstruction model, etc.) can be trained either together or simultaneously (e.g., in a joint fashion in which one or more gradients are passed from one network to another). For example, the aforementioned networks can be trained simultaneously as a large machine-learned model ensemble by providing a first training signal including a loss function to the machine learned extraction model (e.g., the machine-learned watermark extraction and difference reconstruction model).

At 604, the method can include evaluating a loss function that evaluates a difference between the input image and the reconstruction of the input image. In such fashion, the machine-learned model(s) can be trained to increase the quality of the reconstructed image. In some implementations, the machine-learned message extraction model can be trained at least in part by this training signal. In some other implementations, the machine-learned watermark extraction model and the machine-learned difference reconstruction model can be trained at least in part using this training signal.

At 606, the method can include further evaluating the loss function to evaluate a difference between the first output image and the second output image. In such fashion, the machine-learned model(s) can be trained to minimize the perceptual effect of watermarking on the second output image. In some implementations, the machine-learned message extraction model (e.g., the machine-learned watermark extraction model and the machine-learned difference reconstruction model) can be trained at least in part using this training signal. In some other implementations, the machine-learned message generation model (e.g., the machine-learned message generation model and the machine-learned watermark generation model) can be trained at least in part using this training signal.

At 608, the method can include modifying values for one or more parameters of at least the machine-learned message extraction model (e.g., the machine-learned watermark extraction model and the machine-learned difference reconstruction model) based on the loss function. In some implementations, the values for one or more parameters of at least the machine-learned extraction model are based only on the loss function evaluation of the difference between the input image and the reconstructed input image. The difference can be backpropagated through the machine-learned message extraction model (e.g., the machine-learned watermark extraction and difference reconstruction models) to determine values associated with one or more parameters of the model(s) to be updated. The one or more parameters can be updated to reduce the difference evaluated by the loss function (e.g., using an optimization procedure, such as a gradient descent algorithm).

Additionally, in some implementations, the aforementioned loss function can be further backpropagated through the machine-learned message generation model (e.g., the machine-learned message generation model and the machine-learned watermark generation model) to determine values associated with one or more parameters of the model(s) to be updated. The one or more parameters can be updated to reduce the difference evaluated by the loss function (e.g., using a gradient descent algorithm). In such fashion, both the machine-learned message embedding and extraction models (and their respective associated models) can be trained to generate a more accurate reconstructed image. As an example, the machine-learned message generation model can be trained by the loss function to generate a message vector that enables more accurate reconstruction of the difference image.

In some implementations, the method can include modifying values for one or more parameters of the machine-learned message generation model (e.g., the machine-learned message generation model and the machine-learned watermark generation model). More particularly, the model(s) can be trained at least in part using the loss function evaluation of a perceptual difference (e.g., a perceptual loss) between the first output image and the second output image. The difference can be backpropagated through the machine-learned model(s) to determine values associated with one or more parameters of the model(s) to be updated. The one or more parameters can be updated to reduce the difference evaluated by the loss function (e.g., using a gradient descent algorithm). In such fashion, the model(s) can be trained to reduce the perceptual difference associated with adding a watermark to the second output image.

Alternatively, in some implementations, different models of the machine-learned message embedding and extraction models can be trained separately. More particularly, the machine-learned watermark generation and extraction models can be trained simultaneously and separately from the machine-learned message generation and difference reconstruction models. The machine-learned message embedding model and the machine-learned message extraction models can be trained simultaneously using a training signal including a loss function. More particularly, a training signal including a loss function can be backpropagated through the models to train both models simultaneously. As one example, the loss function can evaluate a first difference between the input image and the reconstructed input image. Further, the loss function can, in some implementations, further evaluate a second difference between the fidelity of the first output image and the fidelity of the second output image. These difference(s) can be backpropagated through the machine-learned watermark generation and extraction models to determine values associated with one or more parameters of the model(s) to be updated. The one or more parameters can be updated to reduce the difference evaluated by the loss function (e.g., using a gradient descent algorithm).

Similarly, the machine-learned message generation and machine-learned difference reconstruction models can be trained simultaneously and separately. In some implementations, the embedded message vector is generated and reconstructed using an artificial neural network architecture (e.g., an autoencoder). The neural network architecture can be trained to both generate the embedded message vector for embedding in the output image and reconstruct the difference image from the extracted embedded message (e.g., the message extracted by the machine-learned message extraction model). The machine-learned message generation and difference reconstruction models can be trained simultaneously using a training signal. More particularly, a training signal including a loss function can be backpropagated through the model(s) to train both models simultaneously. In some implementations, the loss function can evaluate a difference between the difference image and the reconstructed difference image. The difference can be backpropagated through the neural network architecture to determine values associated with one or more parameters of the model(s) to be updated. The one or more parameters can be updated to reduce the difference evaluated by the loss function (e.g., using a gradient descent algorithm). Thus, in such fashion, the machine-learned message generation and machine-learned difference reconstruction models can be trained to generate a message representing the difference image and to reconstruct the difference image from the extracted embedded message in a manner that maximizes the quality of the reconstructed difference image.

In some implementations, a discriminator can be utilized to determine the perceptual loss between the first output image and the second output image. The discriminator can be a machine-learned discriminative model (e.g., general adversarial network, linear classifier, support vector machine (SVM), etc.). The discriminator can be trained to determine if the second output image contains an embedded message. As one example, the discriminator can be trained in a supervised fashion using training data including images known to contain embedded messages. The output of the discriminator can, in some implementations, be used as a training signal to the machine-learned watermark generation model and/or the machine-learned message generation model. In such a fashion, the perceptual difference caused by embedding the message in the second output image can be reduced.

Thus, the systems and methods of the present disclosure substantially reduce the data loss associated with encoding images, specifically encoding using lossy compression schemes. As such, the systems and methods of the present disclosure can drastically increase the quality of encoded images, therefore allowing compression to be used in quality-sensitive image storage scenarios in which compression would previously be inoperable.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 4-6 respectively depict steps performed in a particular order for purposes of illustration and discussion, the methods of the present disclosure are not limited to the particularly illustrated order or arrangement. The various steps illustrated in FIGS. 4-6 can be omitted, rearranged, combined, and/or adapted in various ways without deviating from the scope of the present disclosure.

What is claimed is:

1. A computer-implemented method to perform watermark-based image reconstruction to compensate for lossy encoding schemes, the method comprising:
   obtaining, by one or more computing devices, an input image;
   generating, by the one or more computing devices, a first output image by compressing and decompressing the input image according to a lossy compression scheme, wherein the first output image comprises a lossy reconstruction of the input image;
   determining, by the one or more computing devices, a difference image that describes a difference between the input image and the first output image; and
   processing, by the one or more computing devices, the difference image and the input image with a machine-learned message embedding model to generate a second output image as an output of the machine-learned message embedding model, wherein the second output image comprises an embedded message that is based at least in part on the difference image.

2. The computer-implemented method of claim 1, further comprising encoding, by the one or more computing devices, the second output image to obtain an encoded second output image.

3. The computer-implemented method of claim 2, further comprising storing, by the one or more computing devices, the encoded second output image.

4. The computer-implemented method of claim 3, further comprising transmitting, by the one or more computing devices, the encoded second output image to another device.

5. The computer-implemented method of claim 2, further comprising:
   decoding, by the one or more computing devices, the encoded second output image to obtain a decoded version of the second output image;
   using, by the one or more computing devices, a machine-learned message extraction model to extract the embedded message from the decoded version of the second output image to obtain a reconstruction of the difference image; and
   generating, by the one or more computing devices, a reconstruction of the input image based at least in part on the decoded version of the second output image and the reconstruction of the difference image.

6. The computer-implemented method of claim 5, wherein using, by the one or more computing devices, the machine-learned message extraction model to extract the embedded message from the decoded version of the second output image to obtain a reconstruction of the difference image comprises:
   using, by the one or more computing devices, a machine-learned watermark extraction model of the machine-learned message extraction model to extract the embedded message from the decoded version of the second output image to obtain an extracted embedded message; and
   using, by the one or more computing devices, a machine-learned difference reconstruction model to reconstruct the difference image from the extracted embedded message.

7. The computer-implemented method of claim 5, wherein decoding, by the one or more computing devices, the encoded second output image to obtain a decoded version of the second output image comprises:
   determining, by the one or more computing devices and using a discriminator, that the encoded second output image contains the embedded message; and
   decoding, by the one or more computing devices, the encoded second output image to obtain the decoded version of the second output image.

8. The computer-implemented method of claim 1, wherein generating, by the one or more computing devices and using the machine-learned message embedding model, the second output image that comprises the embedded message based at least in part on the difference image comprises:

generating, by the one or more computing devices and as an output of a machine-learned watermark generation model of the machine-learned message embedding model, watermark data based at least in part on the difference image; and adding, by the one or more computing devices, the watermark data to the input image to obtain the second output image.

9. The computer-implemented method of claim 1, wherein generating, by the one or more computing devices and using the machine-learned message embedding model, the second output image that comprises the embedded message that is based at least in part on the difference image comprises:

inputting, by the one or more computing devices, both the input image and the difference image into the machine-learned message embedding model; and receiving, by the one or more computing devices and as a direct prediction of the machine-learned message embedding model, the second output image.

10. The computer-implemented method of claim 1, wherein the embedded message is generated by the machine-learned message generation model based at least in part on the difference image.

11. The computer-implemented method of claim 1, wherein the second output image comprises at least two instances of the embedded message.

12. The computer-implemented method of claim 1, wherein the machine-learned message embedding model comprises an autoencoder.

13. The computer-implemented method of claim 1, wherein the difference image comprises a difference in each pixel value between the input image and the first output image.

14. The computer-implemented method of claim 1, wherein the embedded message comprises a vector in latent space.

15. The computer implemented method of claim 1, wherein the embedded message is embedded by modifying a plurality of pixel values associated with pixels of the second output image.

16. The computer-implemented method of claim 1, wherein the machine-learned message embedding model has been trained on a loss function, wherein the loss function evaluates a difference between training input images and reconstructions of the training input images generated based on variants of the training input images that contain embedded messages generated by the message embedding model.

17. The computer-implemented method of claim 16, wherein the loss function further evaluates a quality difference between the first output image and the second output image.

18. A computing system comprising:
one or more processors; and
a first set of instructions that, when executed by the one or more processors, cause the computing system to perform operations, the operations comprising:
obtaining an input image;
encoding and decoding the input image according to an encoding scheme to generate a first output image;
determining a difference image that describes a difference between the input image and the first output image;
generating, using a machine-learned message embedding model, a second output image that comprises an embedded message generated by the machine-learned message embedding model based at least in part on the difference image;
using a machine-learned message extraction model to extract the embedded message from the second output image to obtain a reconstruction of the difference image;
evaluating a loss function that evaluates a difference between the input image and the reconstruction of the input image; and
modifying values for one or more parameters of at least the machine-learned message extraction model based on the loss function.

19. The computing system of claim 18, further comprising:
a second set of instructions that, when executed by the one or more processors, cause the computing system to perform operations, the operations comprising:
modifying values for one or more parameters of at least the machine-learned message embedding model based on the loss function.

20. The computing system of claim 18, wherein the loss function is further evaluated based at least in part on a difference between the first output image and the second output image.

21. One or more non-transitory computer-readable media that store instructions that, when executed by one or more processors of a computing system, cause the computing system to perform operations comprising:
obtaining an encoded version of an image that contains an embedded message;
decoding the encoded version of the image to obtain a decoded version of the image;
extracting, using a machine-learned message extraction model, the embedded message from the decoded version of the image to obtain a reconstruction of a difference image that describes a difference between an input image and an output image generated through application of an encoding and decoding scheme to the input image; and
generating a reconstruction of the input image based at least in part on the decoded version of the image and the reconstruction of the difference image.

22. The one or more non-transitory computer-readable media instructions of claim 21, wherein generating a reconstruction of the input image comprises adding the difference image to the decoded version of the image.

* * * * *